(12) United States Patent
McGrath

(10) Patent No.: US 9,144,329 B1
(45) Date of Patent: Sep. 29, 2015

(54) ADJUSTABLE FILLER BRACKET ASSEMBLY FOR SNEEZE GUARDS

(71) Applicant: Andrew H. McGrath, Concord, CA (US)

(72) Inventor: Andrew H. McGrath, Concord, CA (US)

( * ) Notice: Subject to any disclaimer, the term of this patent is extended or adjusted under 35 U.S.C. 154(b) by 0 days.

(21) Appl. No.: 14/306,935

(22) Filed: Jun. 17, 2014

(51) Int. Cl.
*A47F 3/12* (2006.01)
*A47F 10/06* (2006.01)
*A47F 9/00* (2006.01)

(52) U.S. Cl.
CPC . *A47F 3/12* (2013.01); *A47F 10/06* (2013.01); *A47F 2010/065* (2013.01)

(58) Field of Classification Search
CPC ........... A47F 10/06; A47F 9/00; A47F 5/005; A47F 2010/065; A47F 3/12; A47F 3/007; A47F 7/0071; A47B 57/00; A47B 2200/0042; A47B 2200/0044; Y10T 103/32368; Y10T 29/49826
USPC ........ 312/137, 140.1, 140.3, 140.4, 284, 285, 312/286, 287, 289, 265.5, 265.6, 280, 312/265.1, 265.2, 265.3, 265.4, 229, 263, 312/114, 140; 248/229.11, 229.2, 229.21, 248/230.21, 230.1, 230.2, 230.9, 231.31, 248/316.2; 403/384, 398, 400
See application file for complete search history.

(56) References Cited

U.S. PATENT DOCUMENTS

| | | | | |
|---|---|---|---|---|
| 4,208,972 | A | * | 6/1980 | Arend et al. .................. 108/184 |
| 4,864,795 | A | * | 9/1989 | Burg ............................... 52/646 |
| 4,892,366 | A | * | 1/1990 | Yerman ...................... 312/140.4 |
| D625,984 | S | * | 10/2010 | McGrath ........................ D8/355 |
| 2003/0047086 | A1 | * | 3/2003 | Matus, Jr. ....................... 99/485 |
| 2006/0175940 | A1 | * | 8/2006 | English ......................... 312/137 |
| 2007/0236112 | A1 | * | 10/2007 | Williman ................... 312/140.4 |
| 2011/0080075 | A1 | * | 4/2011 | Matus, Jr. .................. 312/140.4 |
| 2011/0169384 | A1 | * | 7/2011 | Padden et al. ............. 312/140.4 |
| 2012/0200207 | A1 | * | 8/2012 | Atkins .......................... 312/137 |

* cited by examiner

*Primary Examiner* — Daniel J Troy
*Assistant Examiner* — Andrew Roersma
(74) *Attorney, Agent, or Firm* — Charles L. Thoeming

(57) ABSTRACT

A filler bracket assembly for closing gaps in new or existing sneeze guard assemblies is disclosed. The filler bracket assembly includes dual housings which fit together to provide a cylindrical housing central aperture having an internal diameter sized to receive and affix to a sneeze guard elongated support member. A cap portion is sized to fit on top of the slotted cylindrical housing, and together with gaskets and the filler sneeze guard panel, be affixed thereto by at least one fastener. The split cylindrical housing components allow for easy retro-fit adaptation of a filler bracket assembly to existing, installed sneeze guard assemblies.

19 Claims, 3 Drawing Sheets

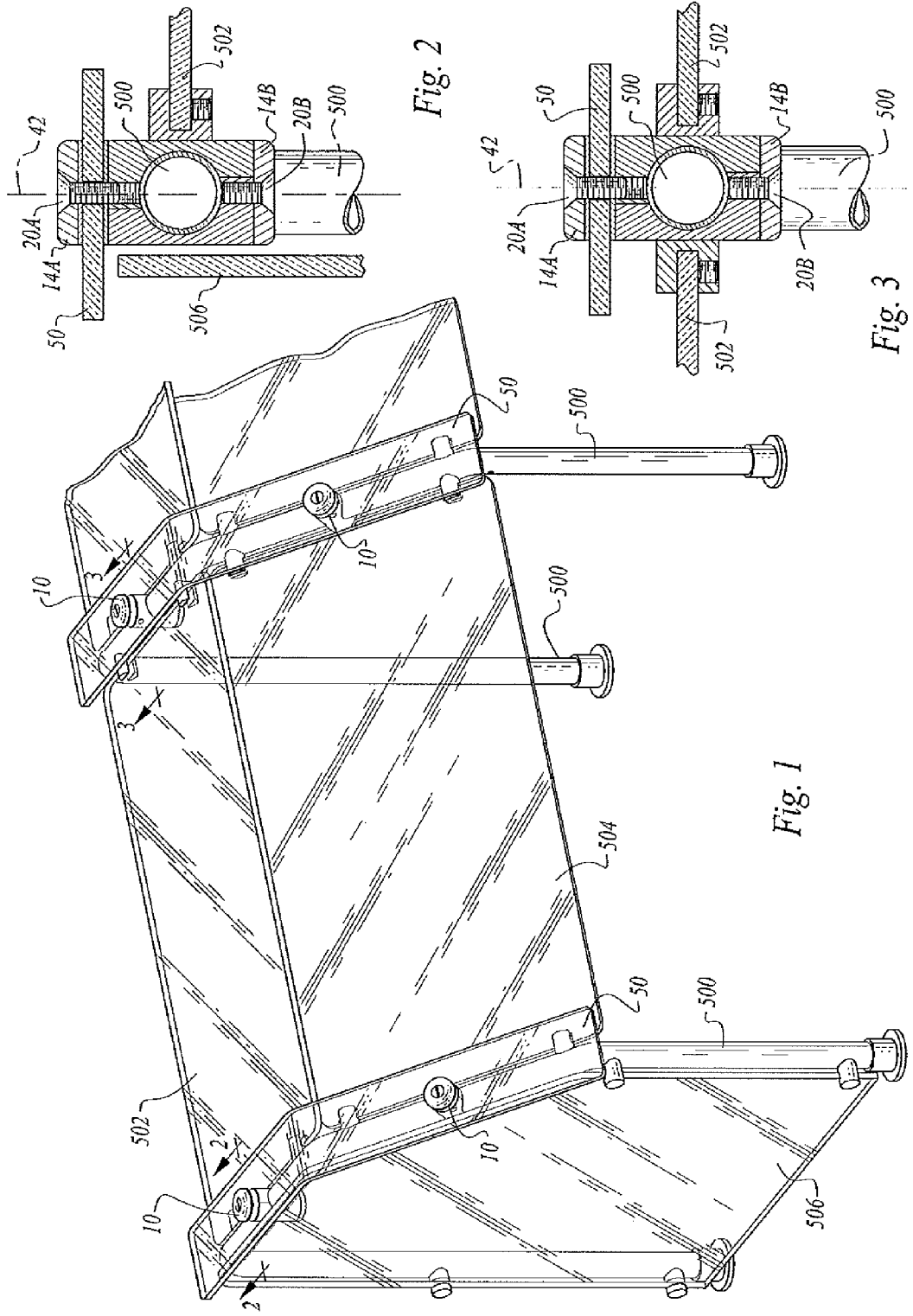

ADJUSTABLE FILLER BRACKET ASSEMBLY FOR SNEEZE GUARDS

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to ready-to-assemble components installed in new sneeze guard assemblies or retro-fitted into existing sneeze guard assemblies for closing gaps between adjacent sneeze guard panels. Such ready-to-assemble components can be typically, but not exclusively, employed to affix filler shield elements to sneeze guards supported by one or more elongated members to increase the effectiveness of the sneeze guard assemblies.

BACKGROUND OF THE INVENTION

Food shields or sneeze guards to help prevent cross contamination and provide customers with a secure sense that the food on display is protected are well known in the art. These assemblies typically comprise an upright or elongated support member, some separate assembly for supporting one or more sneeze guard panels, and apparatus for moving the sneeze guard along or around the elongated support member(s).

Designing and assembling sneeze guards can be complicated since dimensions, load factors, code requirements, and aesthetics converge to present brackets which are labor and component intensive. Often sneeze guards will have many component parts and require several tools for assembly. Moreover, with current technology, installing sneeze guards or the positional adjustment of an assembled sneeze guard requires more than one person and is time consuming.

Sneeze guards for food display and service must meet local health department regulations for installation and maintenance. These local regulations are often shaped by findings from the National Sanitation Foundation (NSF) to standardize sanitation and food safety requirements. The NSF has conducted testing that shows even when sneeze guard panels are installed, these installations often are deficient in protecting displayed food from particles expelled by the forces of a sneeze of cough. Human sneeze forces have been measured at a high of 4.5 meters per second, or 10 miles per hour. That's comparable to the velocity of air expelled by coughing—and a violent cough can push up a larger volume of air, which supplies even more force. Expectorate projected by a sneeze or cough may include bacterial infections, such as bronchiectasis, bacterial pneumonia, pertussis, sinusitis, or *Mycobacterium bovis* (*tuberculosis*).

Many ready to assemble sneeze guards and existing sneeze guards utilize location dependent uprights or support members that multiply the effort needed to design and assemble the sneeze guard components and that intensify the complexity of the process. Presently, most sneeze guards are installed by the seller because of the complexity of assembling. Thus, many sneeze guards are handled fully or most fully assembled which presents bulky cargo that takes up considerable amount of space and that is difficult to transport.

Often, new or existing sneeze guards present one to two inch gaps between elongated support and/or partition posts and sneeze guard panels. It is not uncommon, therefore, for adjacent sneeze guard panels to likewise have gaps between the panels exposing a portion of the protected food on display below the panels. These gaps allow expectorate to reach the displayed food, despite the presence of sneeze guard assemblies. There is a need for a simple, inexpensive and easily adaptable sneeze guard filler bracketing assembly to close such sneeze guard assembly and/or sneeze guard panel gaps.

Additionally, when one part of a piece of sneeze guard assembly is damaged, often the entire product must be returned instead of the damaged part. For example, when an upright or support member fails or is defective, often the entire sneeze guard assembly must be replaced. Similarly, any sneeze guard filler bracketing assembly should be easily replaceable, without requiring extensive disassembly or replacement of the underlying sneeze guard supports and/or assembly.

Finally, the sneeze guards need to be supported by adequate and aesthetically pleasing attachment components for securing sneeze guard panels to one or more fixed support structures. Any sneeze guard filler bracketing assembly necessarily likewise needs to provide adequate and aesthetically pleasing components for enhancing the security of the overall sneeze guard assembly.

DISCLOSURE OF INVENTION

The present invention relates to adjustable filler bracketing assemblies that can be employed readily over a wide array of sneeze guard assemblies and applications to securely enhance the utility of the sneeze guard, while still satisfying the complement of requirements presented by dimensions, load factors, codes, and design preferences. Furthermore, the sneeze guard filler bracketing apparatus disclosed and claimed herein has been fashioned in such a manner as to maximize its utility over a broad range of applications, while minimizing the labor, parts and tools required for implementation. Since the apparatus is characterized by its universality and relative simplicity and ease of installation, it serves to fulfill both original and retrofit bracketing applications. The multiple adjustment features of the apparatus require less "design customizing" for a given installation, thus providing demonstrable cost savings.

The adjustable filler bracketing assembly for sneeze guards includes connector apparatus for mounting and securing filler bracket elements to at least one elongated support member, and allowing for positional adjustment of the elements along the elongated support member longitudinal axis, or around a fixed position on the elongated support member so that a supported filler sneeze guard panel may close any gaps within the original or existing sneeze guard assembly.

The adjustable filler bracketing assembly for sneeze guards provides a cylindrical housing central aperture having an internal diameter sized to receive and affix to an elongated support member. A cap portion is sized to fit on top of the slotted cylindrical housing, and together with gaskets and the filler sneeze guard panel, be affixed thereto by at least one fastener. The split cylindrical housing components allow for easy retro-fit adaptation of a filler bracket assembly to existing, installed sneeze guard assemblies.

Other features, advantages, and objects of the filler bracket assembly for sneeze guards will become apparent with reference to the following description and accompanying drawings.

BRIEF DESCRIPTION OF DRAWINGS

FIG. 1 is a perspective view of an embodiment of a filler bracket 10 and angled sneeze guard filler panels 50 positioned on elongated support members 500 to close gaps between sneeze guard panels 502, 504 and 506 in an exemplary sneeze guard assembly.

FIG. 2 is a detailed cross section of an embodiment of a filler bracket 10 and angled sneeze guard filler panel 50 of FIG. 1 taken at "2-2" closing an end gap between sneeze guard panels 506 and 502-504.

FIG. 3 is a detailed cross section of an embodiment of a filler bracket 10 and angled sneeze guard filler panel 50 of FIG. 1 taken at "3-3" closing a center gap between sneeze guard panels 502-502 and 504-504.

MODES FOR CARRYING OUT THE INVENTION

Referring now to FIGS. 1-11, embodiments of a filler bracket 10 and sneeze guard filler panels to close gaps between sneeze guard panels mounted on elongated support members are provided for a variety of sneeze guard assemblies.

Figure 6:
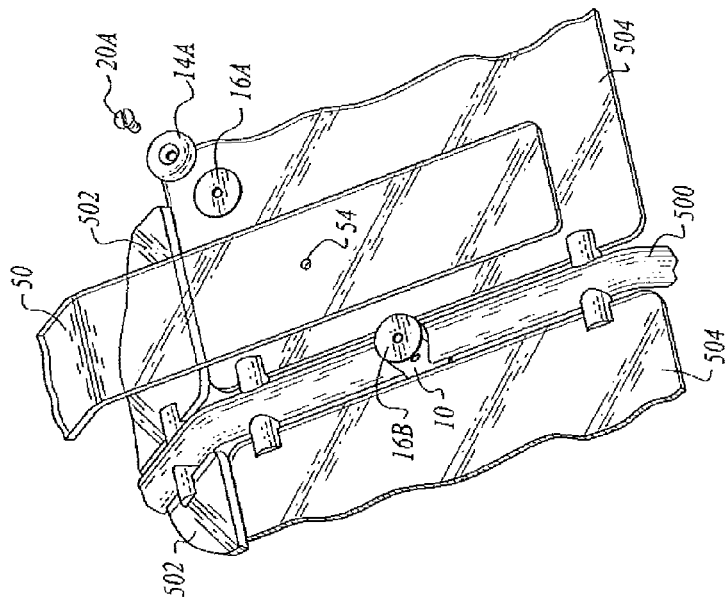
FIG. 6 is a partial exploded perspective view of the embodiment of a filler bracket 10 and sneeze guard filler panel 50 of FIG. 1 closing a center gap between sneeze guard panels 502-502 and 504-504.
Figure 5:
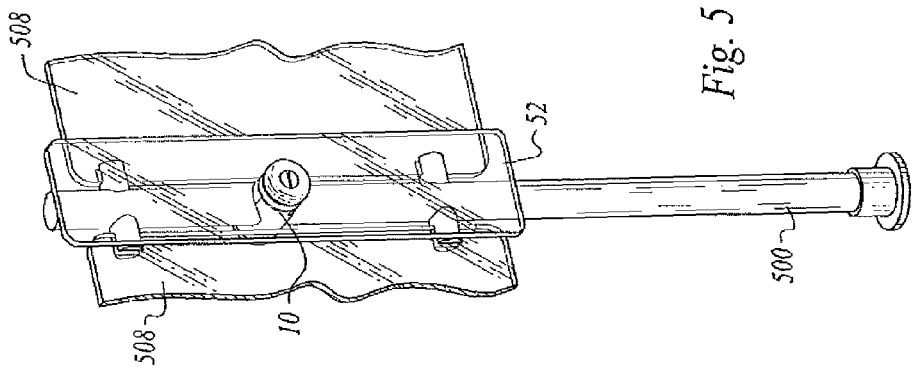
FIG. 5 is a perspective view of an embodiment of a filler bracket 10 and sneeze guard filler panels 52 positioned on an elongated support member 500 to close gaps between adjacent, vertical sneeze guard panels 508 and 508 in an exemplary sneeze guard assembly.
Figure 4:
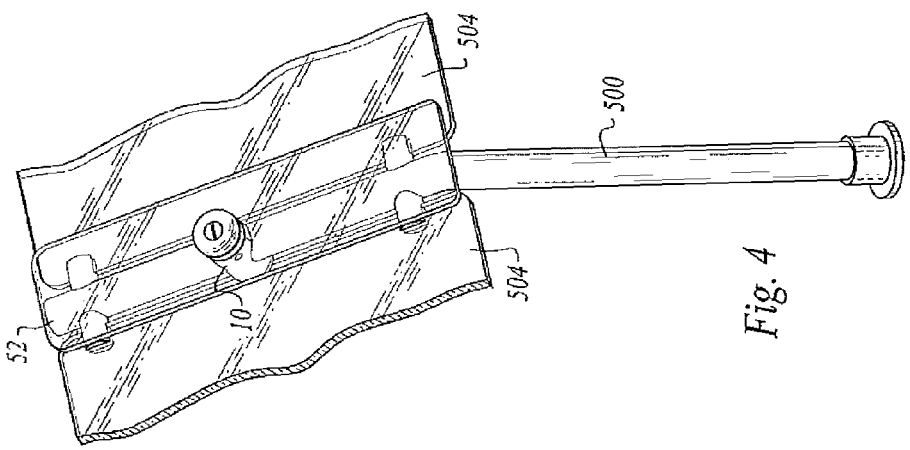
FIG. 4 is a perspective view of an embodiment of a filler bracket 10 and a sneeze guard filler panel 54 positioned on an elongated support member 500 to close gaps between angled sneeze guard panels 504 and 504 in an exemplary sneeze guard assembly.
Figure 7:
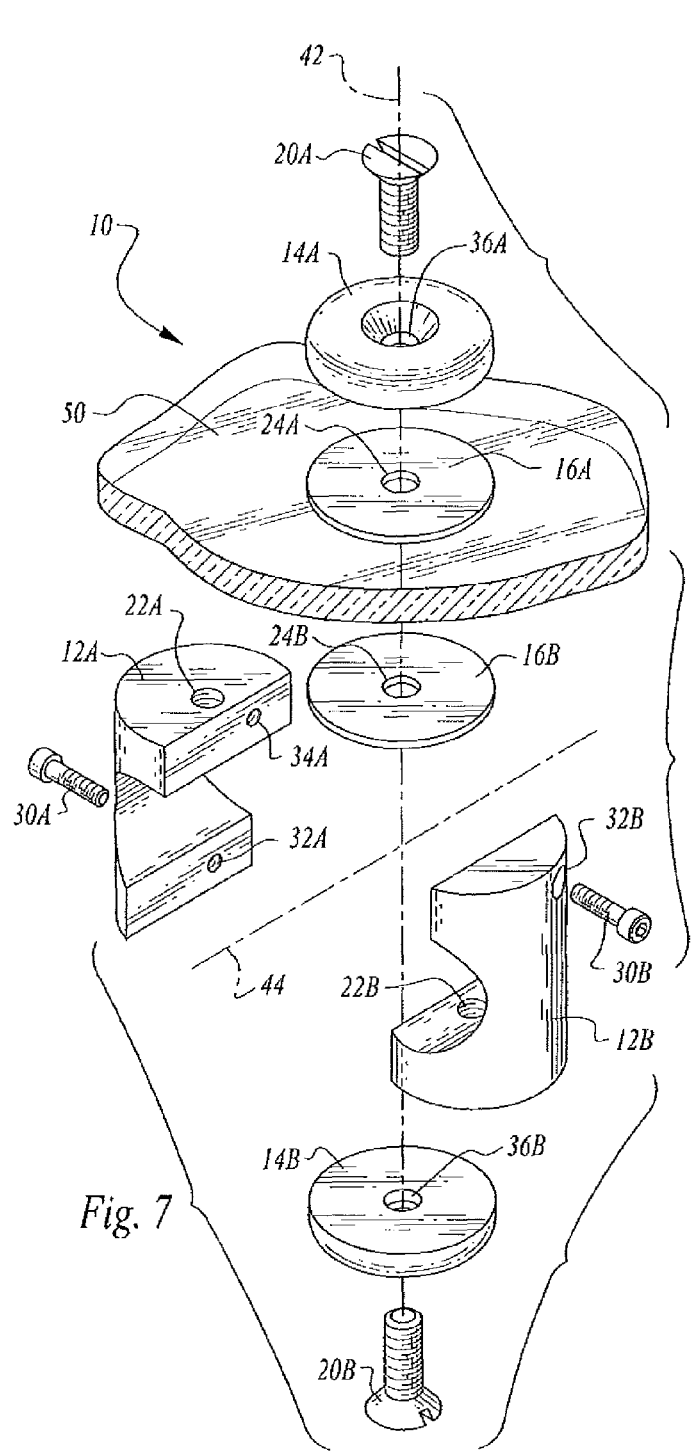
FIG. 7 is an exploded perspective view of an embodiment of the filler bracket 10 of FIG. 1.

The filler bracket 10 includes a first filler bracket housing 12A and a second filler bracket housing 12B, FIG. 7. The first filler bracket housing 12A and the second filler bracket housing 12B, are sized to be joined by and abut off-set, internal planar surfaces to form a filler bracket cylindrical housing having a central aperture along a horizontal filler bracket central axis 44 orthogonal to a longitudinal filler bracket central axis 42, FIGS. 2, 3, 7 and 9. The first filler bracket housing 12A and the second filler bracket housing 12B are secured together by the first threaded fastener 30A and second threaded fastener 30B are received within the first housing threaded aperture 32A and the second housing threaded aperture 32B, and corresponding with the second housing threaded opening 34B and the first housing threaded opening 34A, respectively, FIGS. 7-11.

The filler bracket cylindrical housing central aperture along a horizontal filler bracket central axis 44 is sized to receive and be secured upon an elongated support member 500 once the threaded fasteners 30A and 30B are received and secured into the first housing threaded aperture 32A and the second housing threaded aperture 32B, respectively, FIGS. 7-11. The first housing threaded aperture 32A and a second housing threaded aperture 32B each have a recessed enlarged opening so that threaded fasteners received therein, 30A and 30B respectively, and communicating with threaded apertures 32B and 32A respectively, are flush with the cylindrical surfaces of the filler bracket cylindrical housing, FIGS. 1-6.

The planar front, top, and bottom views of first filler bracket housing 12A and the second filler bracket housing 12B, FIG. 7, are mirror images one of the other, FIGS. 7-10. FIG. 11 is a planar right side view of the second filler bracket housing 12B of the embodiment of filler bracket 10 of FIG. 7. The planar left side view of the second filler bracket housing 12B of the embodiment of filler bracket 10 of FIG. 7 is the mirror image of FIG. 11. The planar left side view of the first filler bracket housing 12A of the embodiment of filler bracket 10 of FIG. 7 is FIG. 11 rotated one hundred eighty degrees. The planar right side view of the first filler bracket housing 12A of the embodiment of filler bracket 10 of FIG. 7 is the mirror image of FIG. 11 rotated one hundred eighty degrees.

Figure 8:
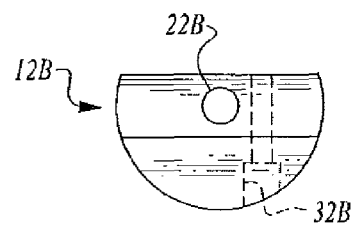
FIG. 8 is a planar top view of the second filler bracket housing 12B of the embodiment of filler bracket 10 of FIG. 7. The planar top view of the first filler bracket housing 12A of the embodiment of filler bracket 10 of FIG. 7 is the mirror image of FIG. 8.
Figure 9:
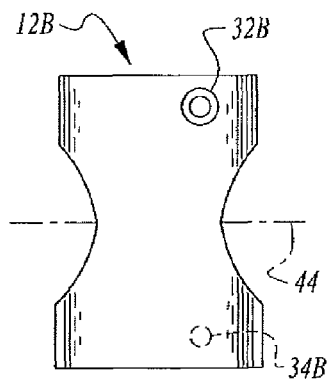
FIG. 9 is a planar front view of the second filler bracket housing 12B of the embodiment of filler bracket 10 of FIG. 7. The planar front view of the first filler bracket housing 12A of the embodiment of filler bracket 10 of FIG. 7 is the mirror image of FIG. 9.
Figure 10:
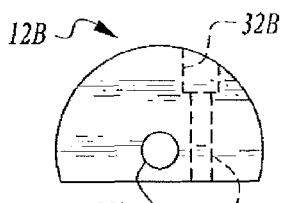
FIG. 10 is a planar bottom view of the second filler bracket housing 12B of the embodiment of filler bracket 10 of FIG. 7. The planar bottom view of the first filler bracket housing 12A of the embodiment of filler bracket 10 of FIG. 7 is the mirror image of FIG. 10.
Figure 11:
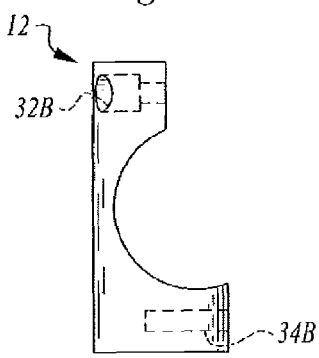
FIG. 11 is a planar right side view of the second filler bracket housing 12B of the embodiment of filler bracket 10 of FIG. 7. The planar left side view of the second filler bracket housing 12B of the embodiment of filler bracket 10 of FIG. 7 is the mirror image of FIG. 11. The planar left side view of the first filler bracket housing 12A of the embodiment of filler bracket 10 of FIG. 7 is FIG. 11 rotated one hundred eighty degrees. The planar right side view of the first filler bracket housing 12A of the embodiment of filler bracket 10 of FIG. 7 is the mirror image of FIG. 11 rotated one hundred eighty degrees.

As depicted in FIGS. 7, and 8-11, the second filler bracket housing 12B includes a second filler bracket housing threaded central aperture 22B, FIGS. 7, 8 and 10 sized to receive a threaded base fastener 20B. A base 14B is sized to conform to the filler bracket cylindrical housing bottom once the first filler bracket housing 12A and the second filler bracket housing 12B are secured together. The base 14B provides a central base recessed aperture 36B to allow the threaded base fastener 20B to be flush-mounted in the central base recessed aperture 36B once the base 14B is secured to the filler bracket cylindrical housing bottom by the threaded base fastener 20B communicating with the second filler bracket housing threaded central aperture 22B, FIGS. 2, 3, 7, 8 and 10. Alternative embodiments of the bracket housing provide non-recessed central base and cap apertures, and cap and base diameters at least equal to the respective cylindrical housing diameter.

Similarly, the first filler bracket housing 12A includes a first filler bracket housing threaded central aperture 22A, FIG. 7, sized to receive a threaded cap fastener 20A. A cap 14A is sized to conform to the filler bracket cylindrical housing top once the first filler bracket housing 12A and the second filler bracket housing 12B are secured together. The cap 14A provides a central base recessed aperture 36A to allow the threaded cap fastener 20A to be flush-mounted in the central base recessed aperture 36A once the cap 14A, the top filler gasket 16A, the bottom filler gasket 16B, and a filler panel 50 are secured to the filler bracket cylindrical housing top by the threaded base fastener 20A communicating with the second filler bracket housing threaded central aperture 22A, FIGS. 2, 3, and 7. The cap 14A, and gaskets 16A and 16B are sized to conform to the filler bracket cylindrical housing top once the first filler bracket housing 12A and the second filler bracket housing 12B are secured together, FIGS. 2, 3, and 7. The cap 14A, gaskets 16A and 16B, and the filler panel 50 all provide apertures, 36A, 24A, 24B, and 54, respectively, sized to allow the threaded base fastener 20A to communicate with the second filler bracket housing threaded central aperture 22A, FIGS. 2, 3, 6, and 7.

As disclosed, embodiments of the filler bracket 10 are adaptable to close gaps between sneeze guard panels 502, 504, 506 and 508 supported by elongated supports 500 in a variety of exemplary sneeze guard assemblies, FIGS. 1-6, either upon initial installation or in retro-fit applications.

The first filler bracket housing 12A, the second filler bracket housing 12B, threaded fasteners 20A, 20B, 30A and 30B, the cap 14A, and the base 14B are separate, unitary pieces preferably made of a strong metal such as aluminum or steel, or high strength carbon materials such as carbon fiber and carbon fiber—reinforced polymer. The preferred embodiment of the first filler bracket housing 12A, the second filler bracket housing 12B, threaded fasteners 20A, 20B, 30A and 30B, the cap 14A, and the base 14B are brushed aluminum.

Embodiments of the filler bracket 10 provide translucent filler panels 50, 52 including, glass, tempered glass or Plexiglas, FIGS. 1-6. Embodiments of the filler bracket 10 provide an angled filler panel 50 including an angle along two planes intersecting at a line transverse to the filler panel 50 longitudinal axis, FIGS. 1-3, and 6.

Therefore, the foregoing is considered as illustrative only of the principles of the filler bracket as applied to sneeze guard assemblies. Additionally, since numerous modifications and changes will readily occur to those skilled in the art, it is not desired to limit the filler bracket to the exact construction and operation shown and described, and further, all suitable modifications and equivalents may be resorted to, falling within the scope of the filler bracket as applied to new or existing sneeze guard assemblies.

I claim:

1. A filler bracket assembly for sneeze guards comprising, in combination:

a) a filler bracket first housing comprising a first housing curved front surface comprising a first housing threaded aperture comprising a recessed opening on the first housing curved front surface, a planar top surface comprising a first housing threaded opening, a first housing planar bottom surface, and two off-set first housing planar back surfaces that communicate with a first housing half-circular concave back surface, a first off-set first housing planar back surface comprising a threaded opening, and a second off-set first housing planar back surface comprising a threaded aperture communicating with the first housing curved front surface threaded aperture;

b) a filler bracket second housing comprising a second housing curved front surface comprising a second housing threaded aperture comprising a recessed opening on the second housing curved front surface, a second housing planar top surface, a second housing planar bottom surface comprising a second housing threaded opening, and two off-set second housing planar back surfaces that communicate with a second housing half-circular concave back surface, a first off-set second housing planar back surface comprising a threaded opening, and a second off-set second housing planar back surface comprising a threaded aperture communicating with the second housing curved front surface threaded aperture, such that when the two off-set first housing planar back surfaces abut the two off-set second housing planar back surfaces a cylindrical housing comprising a cylindrical housing central aperture comprising an internal diameter is presented, the cylindrical housing further comprising a central longitudinal vertical axis, a circular planar top surface comprising the first housing top surface threaded opening centered on the cylindrical housing central longitudinal vertical axis, a circular planar bottom surface comprising the second housing bottom surface threaded opening centered on the cylindrical housing central longitudinal vertical axis;

c) a circular cap comprising a planar top surface, a diameter at least equal to the diameter of the cylindrical housing circular planar top surface, and an aperture centered on the circular cap and comprising a top surface aperture opening;

d) a circular base comprising a planar bottom surface, a diameter at least equal to the diameter of the cylindrical housing circular planar bottom surface, and an aperture centered on the circular base and comprising a bottom surface aperture opening;

e) at least two gaskets, each gasket comprising a diameter at least equal to the diameter of the cylindrical housing circular planar top surface and an aperture centered on the gasket;

f) a panel comprising a longitudinal central axis and at least one aperture centered along the panel longitudinal central axis;

g) a first threaded fastener sized to be received in and correspond to the circular planar top surface first housing threaded opening centered on the cylindrical housing central longitudinal vertical axis and secure to the circular planar top surface the circular cap, and the panel between the at least two gaskets through the apertures in the cap, panel, and at least two gaskets, such that the first thread fastener sized to be received in the circular planar top surface is flush with the cap top surface;

h) a second threaded fastener sized to be received in and correspond to the circular planar bottom surface second housing threaded opening centered on the cylindrical housing central longitudinal vertical axis and secure to the circular base to the planar bottom surface, such that the second thread fastener sized to be received in the circular planar bottom surface is flush with the base bottom surface;

i) a third threaded fastener sized to be received in and correspond to the first housing threaded aperture comprising a recessed opening on the first housing curved front surface and the first off-set second housing planar back surface comprising a threaded opening; and j) a fourth threaded fastener sized to be received in and correspond to the second housing threaded aperture comprising a recessed opening on the second housing curved front surface and the first off-set second housing planar back surface comprising a threaded opening, such that the third and fourth threaded fasteners conjoin the first and second filler bracket housings to provide a cylindrical housing central aperture comprising an internal diameter sized to receive and be secured upon a sneeze guard elongated support member by adjustment of the third and fourth threaded fasteners, whereby one or more filler bracket assemblies secure one or more filler panels to close gaps between sneeze guard surfaces secured by the elongated support member.

2. The filler bracket assembly for sneeze guards according to claim 1, wherein each filler panel is glass.

3. The filler bracket assembly for sneeze guards according to claim 1, wherein each filler panel is tempered glass.

4. The filler bracket assembly for sneeze guards according to claim 1, wherein each filler panel is Plexiglas.

5. The filler bracket assembly for sneeze guards according to claim 2, wherein at least one filler panel is angled along two planes intersecting at a line transverse to the longitudinal axis.

6. The filler bracket assembly for sneeze guards according to claim 3, wherein at least one filler panel is angled along two planes intersecting at a line transverse to the longitudinal axis.

7. The filler bracket assembly for sneeze guards according to claim 4, wherein at least one filler panel is angled along two planes intersecting at a line transverse to the longitudinal axis.

8. The filler bracket assembly for sneeze guards according to claim 1, wherein the aperture centered on the circular cap is recessed.

9. The filler bracket assembly for sneeze guards according to claim 1, wherein the aperture centered on the circular base is recessed.

10. A filler bracket assembly for sneeze guards comprising, in combination:
  a) a filler bracket comprising at least two halves, a central longitudinal axis, a central aperture comprising an internal diameter sized to receive and be secured upon a sneeze guard elongated support member;
  b) at least one fastener assembly to conjoin the filler bracket halves and secure the filler bracket to the sneeze guard elongated support member;
  c) a base plate comprising at least one fastener assembly to attach the base plate to a filler bracket bottom surface; and
  d) a cap comprising at least one fastener assembly to attach the cap, a filler panel, and at least two gaskets to a filler bracket top surface;
  wherein the filling bracket halves further comprise, in combination: a first housing comprising a first housing curved front surface comprising a first housing threaded aperture comprising a recessed opening on the first housing curved front surface, a planar top surface comprising a first housing threaded opening centered on the filler bracket central longitudinal axis, a first housing planar bottom surface, and two off-set first housing planar back surfaces that communicate with a first housing half-circular concave back surface, a first off-set first housing planar back surface comprising a threaded opening, and a second off-set first housing planar back surface comprising a threaded aperture communicating with the first housing curved front surface threaded aperture; and
  a second housing comprising a second housing curved front surface comprising a second housing threaded aperture comprising a recessed opening on the second housing curved front surface, a second housing planar top surface, a second housing planar bottom surface comprising a second housing threaded opening centered on the filler bracket central longitudinal axis, and two off-set second housing planar back surfaces that communicate with a second housing half-circular concave back surface, a first off-set second housing planar back surface comprising a threaded opening and a second off-set second housing planar back surface comprising a threaded aperture communicating with the second housing curved front surface threaded aperture, such that when the two off-set first housing planar back surfaces abut the two off-set second housing planar back surfaces a cylindrical filler bracket comprising the cylindrical housing central aperture and the central longitudinal vertical axis is presented, the cylindrical filler bracket further comprising a circular planar top surface comprising the first housing top surface threaded opening centered on the cylindrical filler bracket central longitudinal vertical axis, a circular planar bottom surface comprising the second housing bottom surface threaded opening centered on the cylindrical filler bracket central longitudinal vertical axis.

11. The filler bracket assembly for sneeze guards according to claim 10, wherein the at least one fastener assembly to attach the base plate to the filler bracket bottom surface comprises a threaded fastener sized to be received in and correspond to the second housing planar bottom surface threaded opening, such that the first thread fastener is flush with a base bottom surface.

12. The filler bracket assembly for sneeze guards according to claim 11, wherein the at least one fastener assembly to attach the cap, a filler panel, and at least two gaskets to a filler bracket top surface comprises a threaded fastener sized to be received in and correspond to the first housing planar top surface threaded opening and secure to the filler bracket top surface the circular cap, and the panel between the at least two gaskets through corresponding apertures in the cap, panel, and at least two gaskets, such that the thread fastener is flush with a cap top surface.

13. The filler bracket assembly for sneeze guards according to claim 12, wherein the at least one fastener assembly to conjoin the filler bracket halves and secure the filler bracket to the sneeze guard elongated support member comprises:
  a) a first threaded fastener sized to be received in and correspond to the first housing threaded aperture comprising a recessed opening on the first housing curved front surface and the first off-set second housing planar back surface comprising a threaded opening; and
  b) a second threaded fastener sized to be received in and correspond to the second housing threaded aperture comprising a recessed opening on the second housing curved front surface and the first off-set second housing planar back surface comprising a threaded opening.

14. The filler bracket assembly for sneeze guards according to claim 10, wherein each filler panel is glass.

15. The filler bracket assembly for sneeze guards according to claim 10, wherein each filler panel is tempered glass.

16. The filler bracket assembly for sneeze guards according to claim 10, wherein each filler panel is Plexiglas.

17. The filler bracket assembly for sneeze guards according to claim 14, wherein at least one filler panel is angled along two planes intersecting at a line transverse to the longitudinal axis.

18. The filler bracket assembly for sneeze guards according to claim 15, wherein at least one filler panel is angled along two planes intersecting at a line transverse to the longitudinal axis.

19. The filler bracket assembly for sneeze guards according to claim 16, wherein at least one filler panel is angled along two planes intersecting at a line transverse to the longitudinal axis.

* * * * *